Oct. 21, 1958
J. W. EVANS
2,856,737
ARTICLE ABRADING MACHINE
Filed Dec. 13, 1955
2 Sheets-Sheet 1
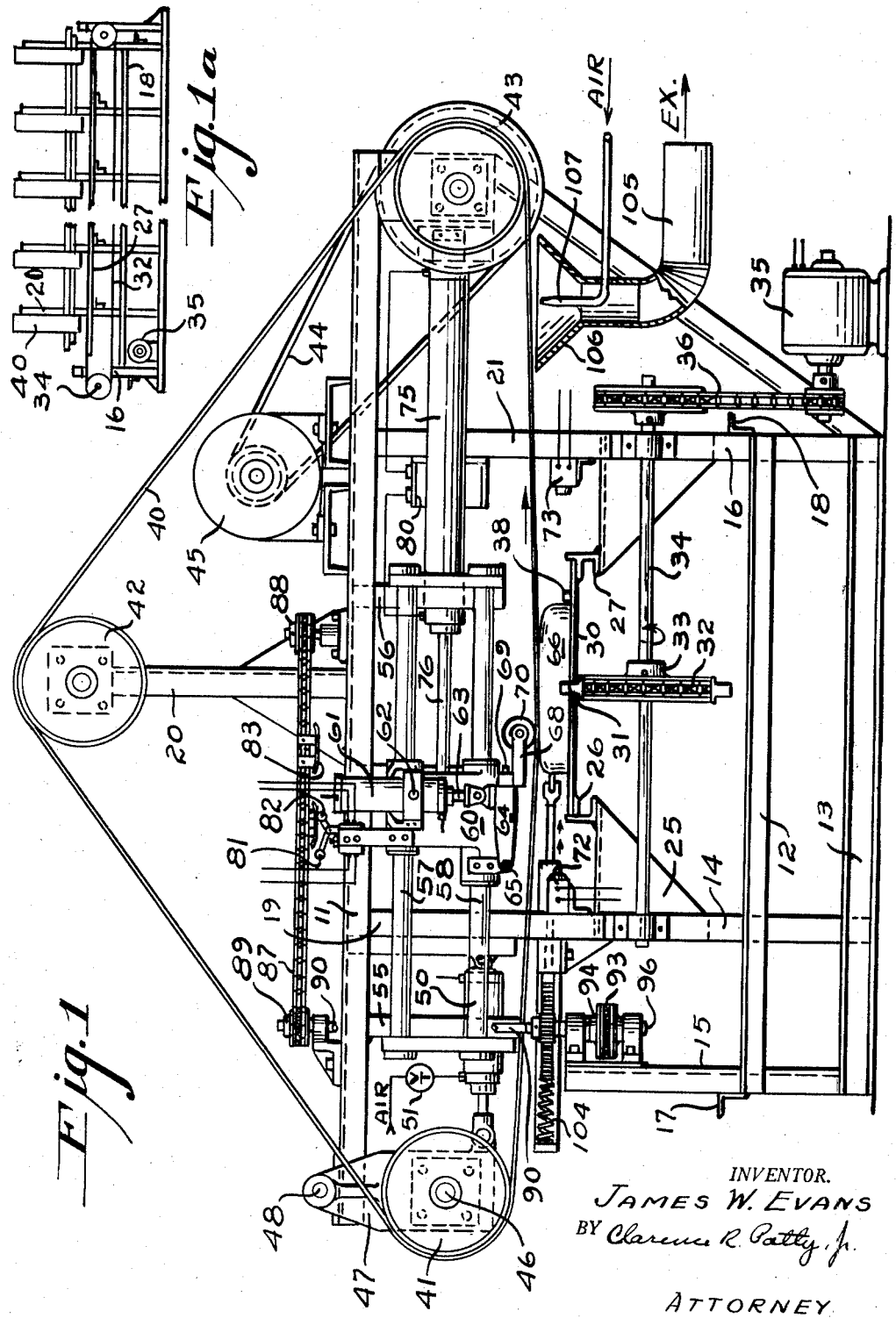
INVENTOR.
JAMES W. EVANS
BY Clarence R. Patty, Jr.
ATTORNEY Oct. 21, 1958  J. W. EVANS  2,856,737
ARTICLE ABRADING MACHINE
Filed Dec. 13, 1955  2 Sheets-Sheet 2
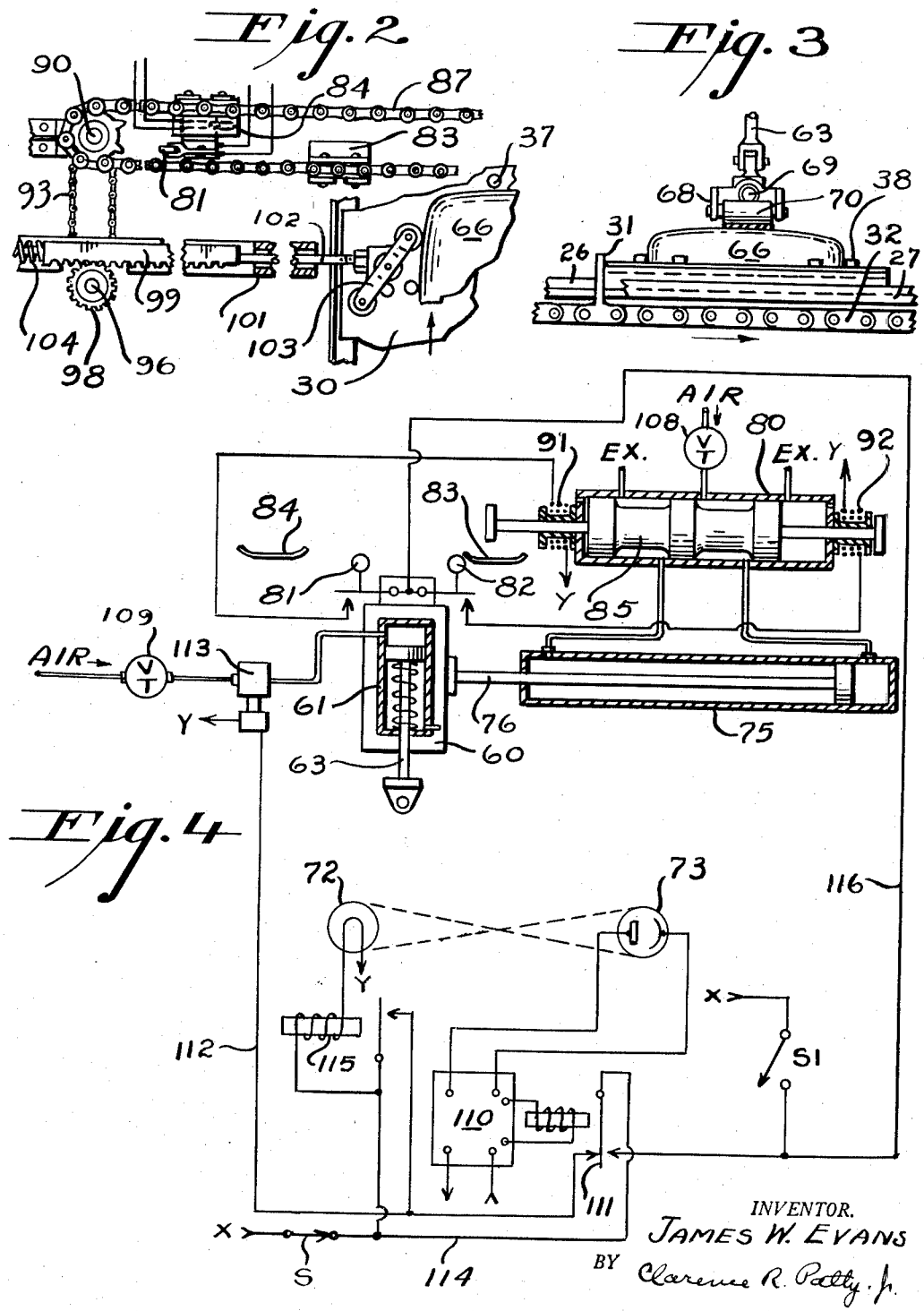

United States Patent Office 2,856,737
Patented Oct. 21, 1958

2,856,737

ARTICLE ABRADING MACHINE

James W. Evans, Corning, N. Y., assignor to Corning Glass Works, Corning, N. Y., a corporation of New York Application December 13, 1955, Serial No. 552,842

5 Claims. (Cl. 51—137)

The present invention relates to article abrading, grinding and/or polishing, and is particularly concerned with the removal of surface irregularities occurring in the convex surfaces of large glass objects, although the invention is in no way limited to such use.

In the manufacture of cathode ray tubes, such for example as television receiver tubes, the panel or viewing screen portions of such tubes are usually formed from charges of molten glass deposited in molds and pressed therein. The external face of the panel is usually of convex form being either of cylindrical or spherical contour. Quite frequently the panels so formed are found to have exterior surface imperfections of a magnitude requiring grinding to a greater degree of uniformity before they are in a condition to be passed through the usual routine surface treatments for ultimate use.

According to the present invention glass articles, such for example as television tube viewing screens or panels, are caused to travel along a linear path with their convex surfaces exposed to a transversely traveling abrasive belt arranged over such path, or successively to a plurality of belts arranged over such path. As a panel is in part brought under a belt a roller forces that portion of the belt under it to engage the panel surface, while the roller support reciprocates the roller between two opposite margins of the panel as it passes under the belt. The net result is that the entire exterior face of the panel is progressively subjected to a uniform surface treatment by the abrasive belt. Also, according to the invention facilities are provided to automatically place reciprocation of the roller under control of a panel during the commencement of its passage under the belt and to also control the range of reciprocation of the roller in accordance with the particular transverse dimension of a panel. Alternatively, reciprocation may be independently controlled. Other features in accordance with the invention will become apparent from its insuing description.

In the accompanying drawings Fig. 1 is an end elevation of a machine embodying the invention showing a panel being abraded.

Fig. 1a is a view diagrammatically illustrating a side elevation of the apparatus as embodying a plurality of abrading units, available in succession.

Fig. 2 is a plan view of a fragment of the machine and of a panel associated therewith.

Fig. 3 is a side elevation of a fragment of the machine and of a panel associated therewith.

Fig. 4 is a combined wiring and piping diagram.

Referring to the drawings in detail there is provided a main under structure or frame composed of suitable transverse members 11, 12, 13, upright members 14, 15 and 16, and longitudinal members such as 17 and 18. Uprights such as 19, 20, and 21 are also provided for each abrading unit. The lengths of members 17 and 18 depend, of course, upon the number of abrading units embodied in the machine, five units being shown in the Fig. 1a illustration. Each member such as 14 or 16 and such as 19 and 21 is provided with a rail supporting bracket such as 25 contributing to the support of a rail 26 or 27. Slidably arranged on rails 26 and 27 are panel supports such as 30 adapted to be engaged by members such as 31 carried by a chain 32. Chain 32 is trained about a drive sprocket 33 carried on a drive shaft 34 continuously driven by a motor 35 through the medium of a drive embodying a chain 36. The support 30 is provided with a group of bosses such as 37 and 38 to positively prevent any panel arranged on such support from being slidable relative thereto.

Since the abrading units employed are alike except that the grit size of the belts such as 40, of the respective units may differ, a detailed description of the unit shown in Fig. 1 will suffice. The abrading belt 40 is trained about idler drums 41 and 42 and a drum 43 driven by a belt 44 by means of a suitable motor 45. The drum 41 is mounted on a shaft 46 rotatable in suitable bearings in a pendant arm 47 pivoted at the top about a pin 48. The lower end of arm 47 is linked to a pneumatic unit 50 to which air is supplied via a valve 51 to hold the belt suitably taut in accordance with the pressure at which air is supplied to such unit.

Depending from transverse frame member 11 are guide rail support members 55 and 56 between which are arranged guide rails 57 and 58 having a carriage 60 slidably arranged thereon. A pneumatic cylinder 61 is pivoted to carriage 60 at 62 and has its piston rod 63 pivotally coupled to one end of a horizontal member 64 whose remote end is pivoted to the carriage at 65. An L-shaped roller supporting arm 68 is pivoted at 69 to member 64 and at its other end carries a rubber roller 70. As will be evident, the arrangement is such that by applying fluid to the upper end of cylinder 61 the roller 70 is brought to bear down on belt 40, and because of being pivoted at 69, is enabled to bear down along its entire length to the extent permitted by the panel contour. The unit 61 is of the spring return type, as indicated in Fig. 4 and is supplied with operating fluid whenever a panel advancing under belt 40 interrupts the passage of light between a light source 72 and a photo-electric cell 73 as will be hereinafter described in further detail.

The carriage 60 is adapted to be driven transversely of the path of travel of the panels by means of a pneumatic cylinder 75 whose piston rod 76 is attached to the carriage 60. The alternate supplying of operating fluid to the opposite ends of cylinder 75 to reciprocate carriage 60 is effected by means of a conventional four way valve 80 having a magnetically operable spool 85 (Fig. 4) under control of mechanically closable switches 81 and 82 supported by the carriage 60. Switches 81 and 82 are adapted to be operated by their engagement with shoes 83 and 84 respectively to effect reversal of the supply of fluid to cylinder 75.

Since the shoes 83 and 84 must be spaced in accordance with the transverse dimension of the panel in order to appropriately regulate the distance of travel of the carriage, they are mounted upon a chain 87 trained about an idler sprocket wheel 88 and a sprocket wheel 89 adapted to be driven by a shaft 90. Shaft 90 is adapted to be driven by a chain 93 trained about a sprocket wheel (not shown) carried by shaft 90 and a similar sprocket wheel 94 carried by a stub shaft 96 carrying a pinion 98 in mesh with a rack 99. Rack 99 is slidably arranged on a support 101 and resiliently biased toward the path of travel of the panels by a spring 104. Rack 99 carries a rod 102 (Fig. 2) provided with a bar 103 provided with rollers adapted to be engaged by a panel and forced to the left a distance depending upon the panel width. As will be seen the rack 99 through the medium of pinion 98 and chains 93 and 87 adjusts the spacing of shoes 83 and 84 in accordance with the width of the panel advancing under belt 40.

In order to collect the dust produced by abrading a panel it is preferable to enclose the lower section of belt 40 in the vicinity of drum 43 and the drum as well and to connect such an enclosure with an exhaust conduit. It is moreover desirable to remove material collected by the belt to extend its useful life. To show such facilities in a simplified manner an exhaust conduit 105 is shown as having a funnel 106 arranged in close proximity to the belt 40. To remove materials embedded in belt 40 there is provided a nozzle 107 within funnel 106 adapted to direct a blast of air against belt 40.

Referring now particularly to Fig. 4 it will be observed that the photo-electric cell 73 is effective to hold a relay 110 energized so long as there is no interruption of the light from the light source 72, as by a panel in the light path. A circuit therefore extends from the X terminal of a suitable current source through a switch S, conductor 114, armature 11 and its front contact, conductor 112 and through the winding of a magnetic valve 113 to a Y terminal of the same current source, to hold the valve closed and thus prevent air being supplied to the upper end of cylinder 61. When use of the machine is to be discontinued the air supply lines to valves 75 and 113 are cut off by means of throttle valves 108 and 109, respectively. To prevent the failure of lamp 72 effecting the inadvertant deenergization of magnet valve 113 while the machine is in operation with no panel in the light path, a relay 115 having back contacts bridging conductors 112 and 114 is included in the circuit of light source 72.

As hereinbefore explained, whenever air is being supplied to cylinder 61 to bring belt 40 into engagement with a panel 66 the carriage 60 is reciprocated. Such reciprocation is by means of air alternately supplied to opposite ends of cylinder 75 via the four way valve 80 whose spool 85 is shifted from one alternative position to the other by energization of its winding 91 or 92. Energization of windings 91 and 92 are respectively by switches 81 and 82. The operating circuits for such windings extend from the current source terminal X, through switch S, conductor 114, the armature and back contact of relay 111, conductor 116 to the movable contact elements of switches 81 and 82.

Reciprocation is alternatively effected by closure of switch S1 when the apparatus is put into use.

As shown in Fig. 4, since the valve spool 85 is in its leftward position, air is being supplied to the right end of cylinder 75 and the left end is being exhausted to atmosphere. As will be seen, at such time that the switch 81 encounters shoe 84 the spool 85 will be shifted to the right to reverse the air supply and exhaust passage connections to cylinder 75. As will be understood since the valve spool 85 remains in the position to which it has been moved by winding 91 or 92 until the other winding becomes energized, the carriage 60 is always brought to one transverse position or the other after a panel has cleared the photo-electric cell light path and disconnected the X terminal of the current source from switches 81 and 82 when reciprocation depends on the interruption of the light path. When certain forms of work are being treated and it is preferable to effect reciprocation of the carriage continuously independently of the photo-electric control, the switch S1 is closed.

What is claimed is:

1. In an abrading machine, an abrading belt, means providing a horizontal path of travel for said belt, a workpiece support, means providing a path of travel for said support under a region of said belt path, a carriage arranged over said belt in an area above such support path, an arm having one end pivoted about a horizontal axis to the underside of said carriage, a roller similarly pivoted to the other end of said arm, means for holding said arm in a position free from application of pressure on said belt, and means under the control of a workpiece arranged on said support when the same is in part under said belt to activate said means as required to press said roller against said belt to engage it with a workpiece thereunder, motor drive means for advancing said support along its path and for continuously driving said belt, and apparatus for reciprocating said carriage between opposite lateral margins of a supported workpiece during passage of said support under said belt to laterally shift the area of contact between the workpiece surface and the belt being depressed by said roller.

2. An abrading machine such as defined by claim 1 which includes workpiece-controlled means for regulating the latitude of the reciprocating movement of said carriage.

3. A machine such as defined by claim 2 wherein said workpiece controlled means comprises a chain trained about two spaced sprocket wheels and extending over paths parallel to the path of travel of said carriage and with said elements arranged on opposite runs of the chain whereby travel of the chain modifies the spacing of said elements.

4. A machine such as defined by claim 3 wherein the means for imparting movement to the chain includes a rack having associated therewith a spring for urging an element carried thereby into the path of travel of an article and adapted to be displaced by the article against the action of such spring a distance dependent on the article dimension.

5. In an abrading machine, an endless abrasive belt, means providing a horizontal linear path of travel for said belt, a workpiece support, means affording a path of travel for said support under and transversely of such belt path, a carriage arranged over such belt path, a carriage-supported horizontal member having one end pivoted about a horizontal axis normal to the belt path and at its other end having a roller of resilient material freely rotatable about a similar axis, and power unit coupled to said member at a point intermediate its ends for holding said roller out of pressure relation with said belt in the absence of a supported article thereunder operable to utilize said roller to depress and conform the region of the belt thereunder to the surface of a workpiece arranged on the support as it is passed under said belt and remotely controlled means for effecting the operation of said unit.

References Cited in the file of this patent

UNITED STATES PATENTS

| | | |
|---|---|---|
| 1,988,577 | Scrimgeour | Jan. 22, 1935 |
| 2,002,666 | Johnson et al. | May 28, 1935 |
| 2,336,004 | Fowler | Dec. 7, 1943 |
| 2,696,565 | Shockley | Dec. 7, 1954 |
| 2,714,787 | Orr | Aug. 9, 1955 |
| 2,722,786 | Carlson | Nov. 8, 1955 |